(12) United States Patent
Merbach et al.

(10) Patent No.: US 8,655,999 B2
(45) Date of Patent: Feb. 18, 2014

(54) AUTOMATICALLY ADJUSTING SCHEDULED INVENTORY OF SWITCHED FABRICS

(75) Inventors: David Lynn Merbach, Rochester, MN (US); Kevin Joseph Webster, Lake Worth, FL (US); Li Zhou, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 11/780,280

(22) Filed: Jul. 19, 2007

(65) Prior Publication Data

US 2009/0024734 A1 Jan. 22, 2009

(51) Int. Cl.
*G06F 15/173* (2006.01)

(52) U.S. Cl.
USPC ............... 709/223; 709/224; 709/221

(58) Field of Classification Search
USPC .................. 709/223, 224, 220–221
See application file for complete search history.

(56) References Cited

U.S. PATENT DOCUMENTS

| | | | |
|---|---|---|---|
| 6,047,323 A | 4/2000 | Krause | |
| 6,112,241 A | 8/2000 | Abdelnour et al. | |
| 6,470,007 B1 | 10/2002 | Berman | |
| 7,039,058 B2 | 5/2006 | Carvey | |
| 7,218,929 B2* | 5/2007 | Snyder et al. | 455/425 |
| 7,328,260 B1* | 2/2008 | Muthiyan et al. | 709/224 |
| 7,934,018 B1* | 4/2011 | Lavallee et al. | 709/248 |
| 2002/0191602 A1* | 12/2002 | Woodring et al. | 370/389 |
| 2002/0194407 A1* | 12/2002 | Kim | 710/104 |
| 2004/0025162 A1* | 2/2004 | Fisk | 718/105 |
| 2004/0066782 A1 | 4/2004 | Nassar | |
| 2004/0160953 A1* | 8/2004 | Banks et al. | 370/386 |

OTHER PUBLICATIONS

Laurel et al., "Issues in Multimedia Interface Design: Media Integration and Interface Agents", ACM, CHI '90 Proceedings, Apr. 1990, pp. 133-139.
Dutt et al., "Efficient Incremental Rerouting for Fault Reconfiguration in Field Programmable Gate Arrays", IEEE, 1999, pp. 173-176.
Singh et al., "MorphoSys: Case Study of a Reconfigurable Computing System Targeting Multimedia Applications", ACM, 2000, pp. 573-578.
"Brocade SMI Agent Developer's Guide", Supporting SMI Agent v110.3.0, Jul. 29, 2005, 173 pages.

* cited by examiner

*Primary Examiner* — Philip B Tran
(74) *Attorney, Agent, or Firm* — Stephen R. Tkocs; Stephen J. Walder, Jr.; Feb Cabrasawan (57) ABSTRACT

A mechanism is provided in a storage management application that automatically reconfigures agents and scheduled probes of agents in cases where the agents do not automatically reconfigure themselves to manage a newly formed fabric after fragment segmentation. The solution does not burden the storage administrator to reconfigure agents or to reconfigure regularly scheduled inventory probes through storage management applications.

20 Claims, 4 Drawing Sheets

AUTOMATICALLY ADJUSTING SCHEDULED INVENTORY OF SWITCHED FABRICS

BACKGROUND

1. Technical Field

The present application relates generally to an improved data processing system and method. More specifically, the present application is directed to a feature for automatically adjusting scheduled inventory of fabrics following fabric merges and segmentations.

2. Description of Related Art

Fibre channel (FC) storage area networks (SANs), or fabrics, are comprised of one or more fibre channel switches. The fibre channel switches are connected to each other through inter-switch links (ISLs), which are active fibre channel cable connections from a port on one switch to a port on another switch. An ISL can "break" if the cable is unplugged or if a port on one of the switches is disabled or goes into a faulty state. This breakage may be planned by a storage administrator or unplanned if, for instance, a cable is accidentally unplugged. If all ISLs between one set of switches and another set of switches in the fabric are broken, this results in fabric segmentation. A segmentation of one fabric means that the fabric splits into two fabrics: two sets of interconnected fibre channel switches that have no connectivity from one set to the other.

Storage management software is used by storage administrators for multiple tasks, including understanding the connectivity (topology) of a SAN and knowing the properties and states of fibre channel switches and storage devices connected to the SAN. A storage management software application may use "agents," also referred to as "data sources," to collect the latest available information about the topology and the switches and devices on the SAN. The agents are responsible for providing such information to client applications through standard or proprietary interfaces. Examples of "agents" are storage management initiative specification (SMIS) agents, common information model (CIM) object manager (OM) (CIMOM) agents, Brocade® switches that are Brocade® application program interface (API) servers, simple network management protocol (SNMP) agents, and host in-band fabric agents that collect fabric information in-band.

Certain types of agents communicate to only one switch in each fabric and can be configured programmatically to manage more than one fabric. In order to manage more than one fabric, one switch for each fabric must be configured with the agent. In one example, the agent may communicate with the one proxy switch for the fabric in order to gather information about all devices for the fabric. If fabric segmentation occurs, the switches and devices on the fabric that does not contain the proxy switch become no longer visible to the agent. Note that for this type of agent, there is no point in configuring the agent with all switches in a fabric in advance in anticipation of an accidental segmentation. The agent only communicates to the first proxy switch even after fabric segmentation.

Thus, fabric segmentation presents a problem for storage management applications. A user of a storage management application may have set up a regularly scheduled inventory collection, also referred to as a probe, of the fabric through the agent. If the fabric segments, the agent no longer provides information on a set of the switches and devices, because these are now on a separate fabric for which the agent is not configured. The new fabric is not visible to the agent because the agent is only configured with one switch from the original fabric.

A user may be aware of the fabric segmentation—either because it was planned or because the storage management application has detected the segmentation and alerted the user—but the user may not be aware that the scheduled fabric probe no longer collects information on devices for which it had formerly collected information. The storage management application has completely lost communication with a set of fibre channel switches, and the user cannot manually add the newly formed fabric to the scheduled probe job because no agent knows any properties, including the world wide name (WWN) of the fabric, or other information for the new fabric.

Furthermore, a switch may move from one fabric to another, or two fabrics may merge to form one fabric even though the sets of switches are unchanged. In addition, a new switch may be added to a fabric, which may change the WWN of the fabric. The WWN is a unique identifier for an entity, such as a port, switch, or the fabric itself. The fabric may get its WWN from a switch; however, when a new switch joins the fabric, it may change the WWN of the fabric.

One known solution is to redesign the behavior of the fabric agent so that the agent automatically reconfigures itself to manage both fabrics after fabric segmentation. However, there are existing agents, such as the Brocade® SMIS agent, which do not automatically reconfigure themselves. Thus, this solution does not work for many existing fabrics today.

Another solution is for the storage administrator to use multiple agents for redundancy. Each agent can be configured with a switch in the fabric, and all agents can manage the same fabric. For proxy agents, such as the Brocade® SMIS agent, this requires a server to be used to host each agent. Having many servers to host separate agents for the same fabric is unfavorable with storage administrators.

SUMMARY

In one illustrative embodiment, a computer program product comprises a computer readable storage medium having a computer readable program embodied thereon. The computer readable program, when executed on a computing device, causes the computing device to responsive to a physical change in a first fabric comprising a first plurality of switches, automatically detect, by a monitor in a storage management application, the change in the first fabric. The change results in a new fabric. The computer readable program further causes the computing device to responsive to the monitor detecting the change in the first fabric, automatically update, by a scheduler in the storage management application, a scheduled probe job definition to manage the new fabric and configure, by the monitor, a fabric agent to manage the new fabric. The computer readable program further causes the computing device to trigger, by the scheduler, the fabric agent to run a probe job according to the updated probe job definition.

In another illustrative embodiment, a storage management apparatus in a storage area network comprises a fabric agent, a user interface that is configured to allow a user to schedule a regular probe of a first fabric comprising a first plurality of switches through the fabric agent a discover mechanism that is configured to access the fabric agent to discover managed fabrics and their switches, a monitor that is configured to automatically detect when a physical change to the first fabric occurs, wherein the change results in a new fabric, an agent configuration component that is configured to configure the fabric agent to manage the new fabric responsive to the monitor detecting the change to the first fabric, a probe mechanism that is configured to probe the first fabric through the fabric agent on schedule, and a scheduler that is configured to trigger the probe mechanism to probe the fabric through the fabric agent according to a scheduled probe job. The scheduler is configured to automatically update the scheduled probe job responsive to the monitor detecting the change in the first fabric. The scheduler is further configured to trigger the fabric agent to run a probe job according to the updated probe job definition.

In a further illustrative embodiment, a method for automatically adjusting scheduled probes of fabrics comprises monitoring, by a fabric agent, a first fabric comprising a first plurality of switches and responsive to a physical change in the first fabric, automatically detecting, by a monitor in a storage management application, the change in the fabric. The change results in a new fabric. The method further comprises responsive to the monitor detecting the change in the first fabric, automatically updating, by a scheduler in the storage management application, a scheduled probe job definition to manage the new fabric and configuring, by the monitor, the fabric agent to manage the new fabric. The method further comprises triggering, by the scheduler, the fabric agent to run a probe job according to the updated probe job definition.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

With reference now to the figures and in particular with reference to FIGS. 1A, 1B, 1C, and 2, exemplary diagrams of storage area networks are provided in which illustrative embodiments of the present invention may be implemented. It should be appreciated that FIGS. 1A, 1B, 1C, and 2 are only exemplary and are not intended to assert or imply any limitation with regard to the environments in which aspects or embodiments of the present invention may be implemented. Many modifications to the depicted environments may be made without departing from the spirit and scope of the present invention.

Figures 1A, 1B:
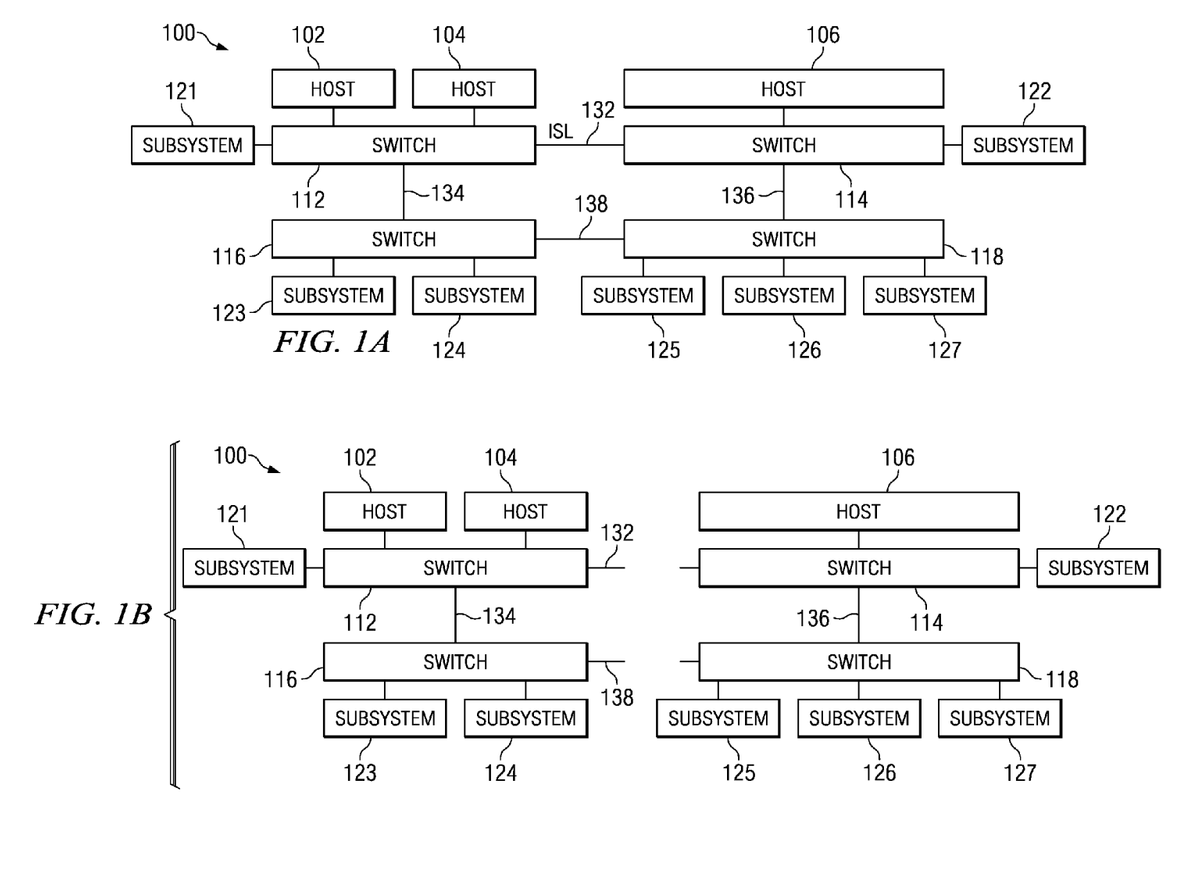
FIGS. 1A-1C depict pictorial representations of an exemplary storage area network in which aspects of the illustrative embodiments may be implemented.
Figure 1C:
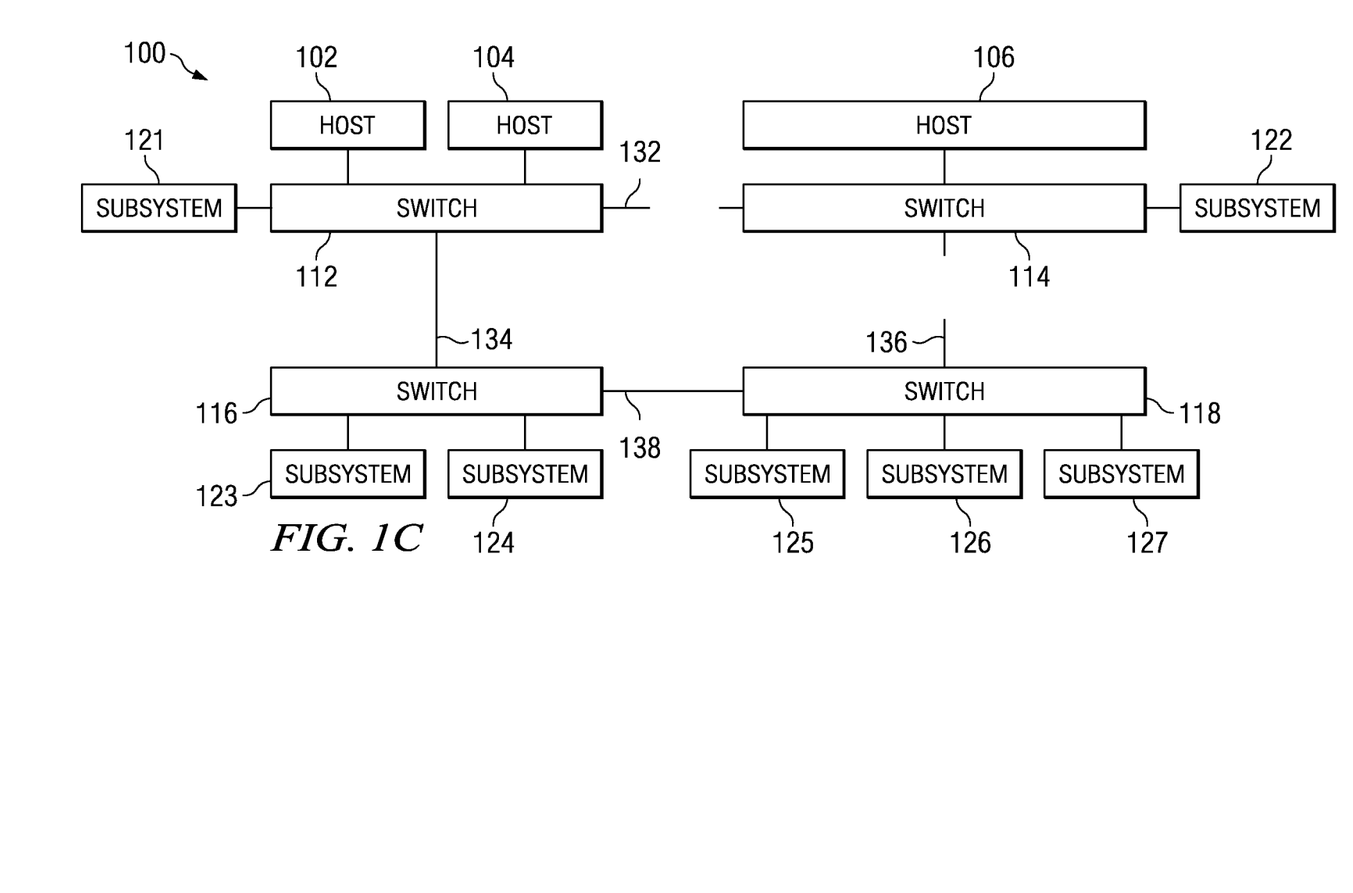

With reference now to the figures, FIGS. 1A-1C depict pictorial representations of an exemplary storage area network in which aspects of the illustrative embodiments may be implemented. With reference to FIG. 1A, storage area network (SAN) 100 may include a network of computers in which aspects of the illustrative embodiments may be implemented. SAN 100 contains hosts 102 and 104, which are connected to switch 112, and host 106, which is connected to switch 114. Switch 112 is connected to switch 114 via inter-switch link (ISL) 132. Switch 112 is also connected to switch 116 via ISL 134, switch 114 is connected to switch 118 via ISL 136, and switch 116 is connected to switch 118 via ISL 138. Switches 112, 114, 116, and 118 form a fabric.

Storage subsystem 121 is connected to switch 112. Storage subsystem 122 is connected to switch 114. Storage subsystems 123 and 124 are connected to switch 116. Storage subsystems 125, 126, and 127 are connected to switch 118. Switches 112, 114, 116, and 118 may be, for example, fibre channel switches. Alternatively, switches 112, 114, 116, and 118 may be other types of switches, such as serial attached SCSI (SAS) switches or the like. Storage subsystems 121-127 may be, for example, fibre channel storage enclosures, SAS storage enclosures, single storage devices, or any combination of storage devices and enclosures.

Each of hosts 102, 104, and 106 can "see" each of storage subsystems 121-127. That is, each of the hosts has a communications path through the fabric to each of the storage subsystems. In addition, switches 112, 114, 116, and 118 form a "mesh," which is a configuration in which one ISL break does not cause fabric segmentation. An ISL can "break" if the cable is unplugged or if a port on one of the switches is disabled or goes into a faulty state. This breakage may be planned by a storage administrator or unplanned if, for instance, a cable is accidentally unplugged. If all ISLs between one set of switches and another set of switches in the fabric are broken, this results in fabric segmentation. A segmentation of one fabric means that the fabric splits into two fabrics: two sets of interconnected fibre channel switches that have no connectivity from one set to the other.

Fabric segmentation occurs when ISL breaks result in two separate fabrics. In FIG. 1B, ISLs 132 and 138 are broken, segmenting the fabric. Hosts 102 and 104 can see storage subsystems 121, 123, and 124 through switches 112 and 116. Host 106 can see storage subsystems 122 and 125-127 through switches 114 and 118. In FIG. 1C, ISLs 132 and 136 are broken. Hosts 102 and 104 can see storage subsystems 121 and 123-127 through switches 112, 116, and 118. Host 106 can see storage subsystem 122 via switch 114.

In accordance with an illustrative embodiment, a mechanism is provided that automatically reconfigures agents and scheduled probes of agents in cases where the agents do not automatically reconfigure themselves to manage a newly formed fabric after fragment segmentation. The solution does not burden the storage administrator to reconfigure agents or to reconfigure regularly scheduled inventory probes through storage management applications.

Storage management initiative specification (SMIS) is a guide to building systems using modules that plug together. SMIS-compliant storage modules interoperate in a system and function in consistent, predictable ways, regardless of which vendor built them, provided that the modules use CIM language and adhere to sets of specifications called CIM schema. Simple network management protocol (SNMP) is a widely used network monitoring and control protocol. Data are passed from SNMP agents, which are hardware and/or software processes reporting activity in each network device (hub, router, bridge, etc.) to the workstation console used to oversee the network. The agents return information contained in a management information base, which is a data structure that defines what is obtainable from the device and what can be controlled (turned off, on, etc.).

Both SMIS and SNMP are out of band. SNMP is out-of-band communication directly between a storage management application and a switch that supports SNMP over an Internet Protocol (IP) network. For proxy SMIS Agents, the communication between the storage management application and the SMIS Agent is always out of band over an IP network. The communication between the proxy SMIS Agent and a switch may be in-band or out of band (although all known implementations of proxy SMIS Agents for switches use out-of-band communication with the switch(es)). The case where communication between the SMIS Agent and the switches is out of band is relevant for this invention.

Figure 2:
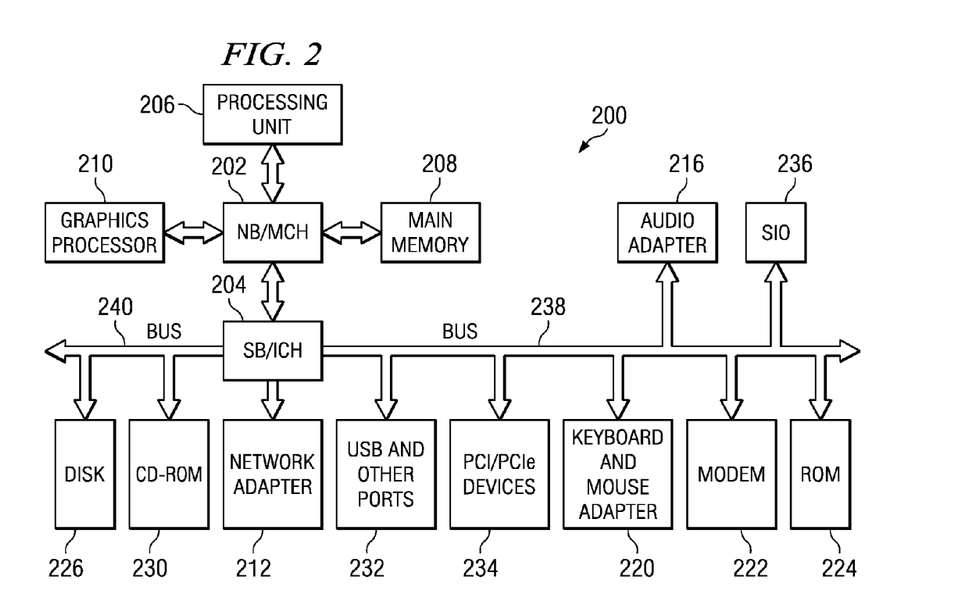
FIG. 2 is a block diagram of an exemplary data processing system in which aspects of the illustrative embodiments may be implemented.

With reference now to FIG. 2, a block diagram of an exemplary data processing system is shown in which aspects of the illustrative embodiments may be implemented. Data processing system 200 is an example of a computer, such as hosts 102, 104, and 106 in FIGS. 1A-1C, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1A-1C and 2 may vary depending on the implementation. Other internal hardware or peripheral devices, such as flash memory, equivalent non-volatile memory, or optical disk drives and the like, may be used in addition to or in place of the hardware depicted in FIGS. 1A-1C and 2. Also, the processes of the illustrative embodiments may be applied to a multiprocessor data processing system, other than the SMP system mentioned previously, without departing from the spirit and scope of the present invention.

Figure 3:
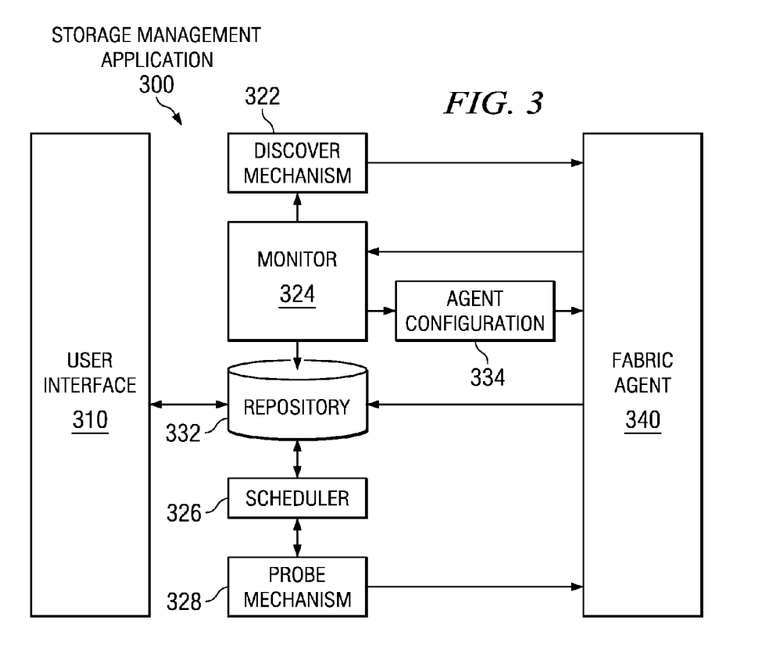
FIG. 3 is a block diagram illustrating a storage management application in accordance with an illustrative embodiment.

FIG. 3 is a block diagram illustrating a storage management application in accordance with an illustrative embodiment. Storage management application 300 may run on a host, such as one of hosts 102, 104, and 106 in FIGS. 1A-1C. However, portions of storage management application 300 may run on other elements within a storage area network. For example, fabric agent 340 may run in a switch, such as one of switches 112, 114, 116, and 118, or user interface 310 may run in a user workstation.

User interface 310 allows a user to schedule a regular probe of a fabric through fabric agent 340. For instance, the user may schedule a nightly probe. The schedule is persisted in repository 332. Scheduler 326 triggers probe mechanism 328 to probe the fabric through fabric agent 340 on schedule. The results of the probe, including the details of the fabric topology, are persisted in repository 332.

Monitor 324 detects when fabric segmentation or other changes to the fabric(s) occur. Monitor 324 may detect fabric segmentation either through an event notification from fabric agent 340 or from analysis of the most recent probe results compared to the previous probe results, for example. Monitor 324 may access repository 332 to retrieve a list of switches that are no longer visible by fabric agent 340. Monitor 324 then passes a list to agent configuration mechanism 334, which configures fabric agent 340 to manage the identified switches. Agent configuration mechanism 334 may configure fabric agent 340 using an application programming interface (API) call, for example.

Monitor 324 then triggers discover mechanism 322 to access fabric agent 340 to discover managed fabrics and their switches. Discover mechanism 322 retrieves data about the fabrics, switches, and relationships between them from fabric agent 340, and discover mechanism 322 persists them in repository 332. Scheduler 326 then updates the scheduled probe of the original fabric in repository 332 to include the new fabric as well. User interface 310 or another mechanism, like a CLI, updates repository 332 for the scheduled probe job and entities to be probed. Discover mechanism 322 or probe mechanism 328 updates repository 332 with entities discovered/re-discovered, such as switches, fabrics, et cetera. Scheduler 326 automatically triggers probe mechanism 328 to run the updated probe. Probe mechanism 328 gathers the information from fabric agent 340 and then persists the information in repository 332. The user can then see in user interface 310 that the scheduled probe job now includes the original fabric and the new fabric that resulted from segmentation.

Furthermore, monitor 324 may detect when a switch is removed from one fabric and added to another fabric. Monitor 324 triggers discover mechanism 322, which retrieves data about the fabrics, switches, and relationships between them from fabric agent 340, and discover mechanism 322 persists them in repository 332, including the fabric to which the switch was moved. Monitor 324 automatically triggers probe mechanism 328 to run the updated probe. Probe mechanism 328 persists the results of the updated probe in repository 332. The user can then see in user interface 310 that the scheduled probe job now includes the fabric that includes the switch that was moved.

Still further, monitor 324 may detect when two fabrics merge. Repository 332 may store a schedule of a probe job for two fabrics. When monitor 324 detects that the two fabrics have merged, monitor 324 automatically triggers probe mechanism 328 to run the updated probe. Probe mechanism 328 gathers the information from fabric agent 340 and then persists the information in repository 332, including updating the scheduled probe to include only the remaining fabric. The user can then see in user interface 310 that the scheduled probe job now includes the merged fabric.

In addition, monitor 324 may detect when a new switch is added to a fabric and changes the fabric world wide name (WWN). Probe mechanism 328 gathers the information from fabric agent 340 and then persists the information in repository 332 with the new WWN.

In accordance with one illustrative embodiment, a scheduled probe is associated with a set of switches in repository 332, rather than the probe being associated with a set of fabrics. Thus, the set of switches associated with a probe is never changed unless a user changes the set of fabrics probed. However, the user sees the probe as being associated with a set of fabrics that may be automatically changed due to fabric segmentations, merges, and so forth.

Figure 4:
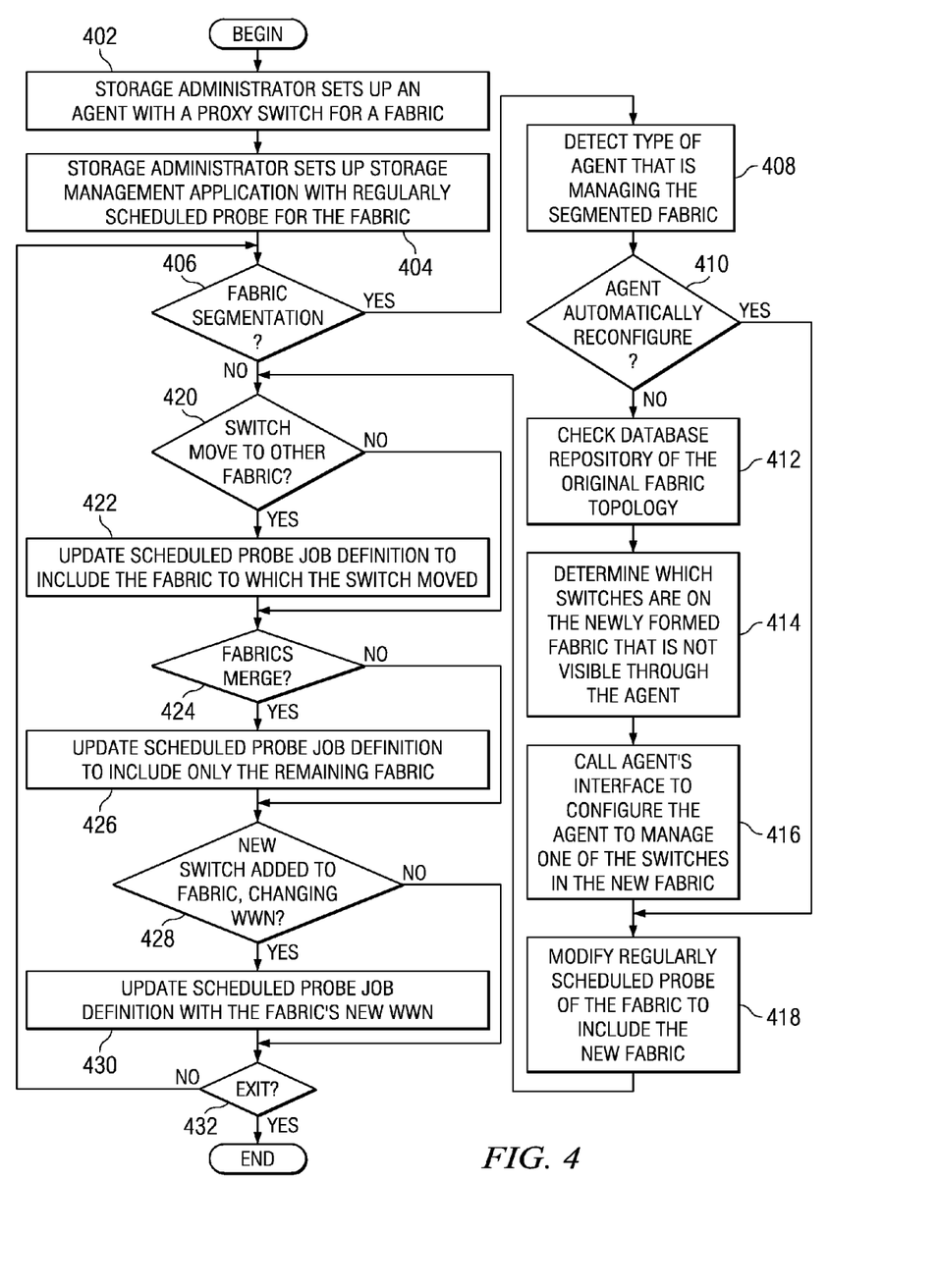
FIG. 4 is a flowchart illustrating operation of a storage management application in accordance with an illustrative embodiment.

FIG. 4 is a flowchart illustrating operation of a storage management application in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference now to FIG. 4, operation begins, and a storage administrator sets up an agent with a proxy switch for a fabric (block 402). The storage administrator sets up the storage management application with a regularly scheduled probe on the fabric (block 404). Then, the storage management application determines whether fabric segmentation occurs (block 406). The storage management application may be notified by an asynchronous event of a change to the topology of the fabric. The asynchronous event may come from a fabric agent. This may occur between block 404 and block 406. Alternatively, the storage management application may determine after processing results from a scheduled inventory collection that the topology of a fabric has changed. Again this may happen between block 404 and block 406. If fabric segmentation occurs, the storage management application detects the type of agent that is managing the segmented fabric (block 408) and determines whether the agent is a type that is capable of automatically reconfiguring itself to manage the segmented fabric (block 410). Some fabric agents are embedded on the switch. The storage management application may determine whether the agent is on a proxy host and, if so, then determine whether the agent is capable of automatically reconfiguring itself.

If the agent is not capable of automatic reconfiguration in block 410, the storage management application checks the database repository of the original fabric topology (block 412). The storage management application determines which switches are on the newly formed fabric that is not visible from the agent (block 414). The storage management application then calls the agent's interface to configure the agent to manage one of the switches in the new fabric (block 416). The storage management application then modifies the regularly scheduled probe to include the new fabric (block 418). If the agent is capable of automatic reconfiguration in block 410, operation proceeds directly to block 418 to modify the regularly scheduled probe to include the new fabric.

Thereafter, or if the storage management application determines that fabric segmentation has not occurred in block 406, the storage management application determines whether a switch moved to another fabric (block 420). If a switch moved to another fabric, the storage management application updates the scheduled probe job definition to include the fabric to which the switch moved (block 422).

Thereafter, or if the storage management application determines that a switch has not moved to another fabric in block 420, the storage management application determines whether two fabrics merge (block 424). If two fabrics merge, the storage management application updates the scheduled probe job definition to include only the remaining fabric (block 426).

Thereafter, or if the storage management application determines that a fabric merge has not occurred in block 424, the storage management application determines whether a new switch is added to the fabric that changes the WWN of the fabric (block 428). If a new switch is added changing the WWN of the fabric, the storage management application updates the scheduled probe job definition with the new WWN (block 430).

Thereafter, or if the storage management application determines that a new switch is not added changing the WWN of the fabric in block 428, the storage management application determines whether an exit condition exists (block 432). If an exit condition exists, operation ends. If an exit condition does not exist in block 432, operation returns to block 406 to determine whether fabric segmentation occurs.

Thus, the illustrative embodiments solve the disadvantages of the prior art by providing a mechanism in a storage management application that automatically reconfigures agents and scheduled probes of agents in cases where the agents do not automatically reconfigure themselves to manage a newly formed fabric after fragment segmentation. The solution does not burden the storage administrator to reconfigure agents or to reconfigure regularly scheduled inventory probes through storage management applications.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage memory having a computer readable program embodied thereon, wherein the computer readable program, when executed on a computing device, causes the computing device to:
   configure a probe job definition to manage a first switched fabric using a fabric agent, wherein the probe job definition defines a schedule of a probe mechanism to run a probe job to collect details of the first switched fabric using the fabric agent and wherein a switch of the first switched fabric is configured with the fabric agent;
   responsive to a physical change in the first fabric comprising a first plurality, of switches, automatically detect, by a monitor in a storage management application, the change in the first switched fabric, wherein the change results in a new switched fabric comprising a second plurality of switches, wherein the second plurality of switches is different from the first plurality of switches;
   responsive to the monitor detecting the change in the first switched fabric, identify the fabric agent that is managing the first switched fabric and determine whether the fabric agent is capable of automatically reconfiguring itself to manage the new switched fabric;
   responsive to the fabric agent not being capable of automatically reconfiguring itself to manage the new switched fabric, automatically update, by a scheduler in the storage management application, the probe job definition to manage the new switched fabric m form an updated probe job definition;
   configure, by the monitor, the fabric agent to manage the new switched fabric; and
   trigger, by the scheduler, the probe mechanism to run a probe job according to the updated probe job definition using the fabric agent.

2. The computer program product of claim 1, wherein the change is a fabric segmentation, wherein the computer readable program, when executed on the computing device, further causes the computing device to:
   determine which switches in the new fabric are not visible through the fabric agent; and
   configure the fabric agent to manage a switch in the new switched fabric.

3. The computer program product of claim 1, wherein the change is a switch within the first plurality of switches moving from the first switched fabric to the new switched fabric.

4. The computer program product of claim 1, wherein the change is a fabric merge, and wherein the new switched fabric comprises the first plurality of switches from the first switched fabric and a second plurality of switches from a second switched fabric.

5. The computer program product of claim 1, wherein the change is a new switch being added to the first plurality of switches, wherein the new switch changes the world wide name of the first switched fabric.

6. The computer program product of claim 1, wherein the computer readable program, when executed on the computing device, further causes the computing device to:

store a configuration of the first switched fabric in a repository as a first set of switches comprising the first plurality of switches; and store a configuration of the new switched fabric in the repository as a second set of switches comprising a second plurality of switches.

7. The computer program product of claim 6, wherein the computer readable program, when executed on the computing device, further causes the computing device to:

present to a user through a user interface the new switched fabric as being included in the scheduled probe job.

8. A storage management apparatus in a storage area network, comprising:

a fabric agent, and wherein a switch of a first switched fabric is configured with the fabric agent;

a user interface that is configured to allow a user to schedule a regular probe of the first switched fabric comprising a first plurality of switches through the fabric agent;

a discover mechanism that is configured to access the fabric agent to discover managed fabrics and their switches;

a monitor that is configured to automatically detect when a physical change to the first fabric occurs, wherein the change results in a new switched fabric;

an agent configuration component that is configured to identify that the fabric agent is managing the first switched fabric, determine whether the fabric agent is capable of automatically reconfiguring itself to manage the new switched fabric, and responsive to the fabric agent not being capable of automatically reconfiguring itself to manage the new switched fabric, automatically configure the fabric agent to manage the new switched fabric responsive to the monitor detecting the change to the first fabric;

a probe mechanism that is configured to probe the first switched fabric through the fabric agent on schedule; and a scheduler that is configured to trigger the probe mechanism to probe the first switched fabric through the fabric agent according to a scheduled probe job, wherein the scheduler is configured to automatically update the scheduled probe job responsive to the monitor detecting the change in the first switched fabric and trigger the fabric agent to run a probe job according to the updated probe job definition.

9. The apparatus of claim 8, further comprising:
a repository,
wherein the user interface stores the schedule in the repository.

10. The apparatus of claim 9, wherein the discover mechanism is configured to store information for the managed fabrics and their switches in the repository, wherein each fabric is stored as a set of switches.

11. The apparatus of claim 8, wherein the change is a fabric segmentation, wherein the agent configuration component is configured to determine which switches in the new switched fabric are not visible through the fabric agent and configure the fabric agent to manage a switch in the new switched fabric.

12. The apparatus of claim 8, wherein the change is a switch within the plurality of switches moving from the first switched fabric to the new switched fabric.

13. The apparatus of claim 8, wherein the change is to fabric merge, and wherein the new fabric comprises the first plurality of switches from the first switched fabric and a second plurality of switches from a second switched fabric.

14. The apparatus of claim 8, wherein the change is a new switch being added to the first plurality of switches, wherein the new switch changes the world wide name of the first switched fabric.

15. A method for automatically adjusting scheduled probes of fabrics, the method comprising:

configuring a probe job definition to manage a first switched fabric using a fabric agent, wherein the probe job definition defines a schedule of a probe mechanism to run a probe job to collect details of the first switched fabric using the fabric agent and wherein a switch of the first switched fabric is configured with the fabric agent;

monitoring, by a fabric agent, the first switched fabric comprising a first plurality of switches;

responsive to as physical change in the first switched fabric, automatically detecting, by a monitor in a storage management application, the change in the first switched fabric, wherein the change results in a new switched fabric comprising a second plurality of switches, wherein the second plurality of switches is different from the first plurality of switches;

responsive to the monitor detecting the change in the first switched fabric, identifying a fabric agent that is managing the first switched fabric and determining whether the fabric agent is capable of automatically reconfiguring itself to manage the new switched fabric;

responsive to the fabric agent not being capable of automatically reconfiguring itself to manage the new switched fabric, automatically updating, by a scheduler in the storage management application, the probe job definition to manage the new switched fabric to form an updated probe job definition;

configuring, by the monitor, the fabric agent to manage the new switched fabric; and triggering, by the scheduler, the probe mechanism to run a probe job according to the updated probe job definition using the fabric agent.

16. The method of claim 15, wherein the change is a fabric segmentation, the method further comprising:

determining which switches in the new switched fabric are not visible through the fabric agent; and configuring the fabric agent to manage a switch in the new switched fabric.

17. The method of claim 15, wherein the change is a switch within the plurality of switches moving from the first switched fabric to the new switched fabric.

18. The method of claim 15, wherein the change a fabric merge, and wherein the new switched fabric comprises the first plurality of switches from the first switched fabric and a second plurality of switches from a second switched fabric.

19. The method of claim 15, wherein the change is a new switch being added to the first plurality of switches, wherein the new switch changes the world wide name of the first switched fabric.

20. The method of claim 15, wherein a configuration of the first switched fabric is stored in a repository as a first set of switches comprising the first plurality of switches.

* * * * *